(12) United States Patent
Arora et al.

(10) Patent No.: US 9,715,680 B2
(45) Date of Patent: Jul. 25, 2017

(54) REMINDER MESSAGES

(75) Inventors: Puneet Kumar Arora, New Delhi Delhi (IN); Diane R Hammerstad, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1233 days.

(21) Appl. No.: 13/562,756

(22) Filed: Jul. 31, 2012

(65) Prior Publication Data

US 2014/0040919 A1  Feb. 6, 2014

(51) Int. Cl.
*G06F 3/00*  (2006.01)
*G06Q 10/10*  (2012.01)

(52) U.S. Cl.
CPC .............. *G06Q 10/1093* (2013.01)

(58) Field of Classification Search
CPC .................. G06Q 10/10; G06Q 10/1093
See application file for complete search history.

(56) References Cited

U.S. PATENT DOCUMENTS

| | | |
|---|---|---|
| 7,109,848 B2 | 9/2006 | Schybergson |
| 7,327,834 B1 | 2/2008 | Hiers et al. |
| 7,447,989 B2 | 11/2008 | Rousselle et al. |
| 7,797,204 B2 | 9/2010 | Balent |
| 7,821,874 B2 | 10/2010 | Liu et al. |
| 8,180,037 B1 | 5/2012 | Delker et al. |
| 2006/0044594 A1* | 3/2006 | Shirai ................ 358/1.14 |
| 2008/0005168 A1 | 1/2008 | Huff et al. |
| 2009/0168607 A1* | 7/2009 | Liu et al. ............ 368/10 |
| 2009/0313299 A1 | 12/2009 | Bonev et al. |
| 2012/0226779 A1* | 9/2012 | Crucs ................. 709/219 |

FOREIGN PATENT DOCUMENTS

GB  2472067  1/2011

* cited by examiner

*Primary Examiner* — H S Sough
*Assistant Examiner* — Carina Yun
(74) *Attorney, Agent, or Firm* — HP Inc. Patent Department (57) ABSTRACT

In one embodiment, event data descriptive of an event to occur at an event time is received at a first computer system via a network. Reminder data, descriptive of a reminder time to occur on or before the event time, is received via the network. At a time after receipt of the event data, article data descriptive of an article to be associated with the event is receive via the network. The article data is data created during an electronic scanning operation. At the reminder time a reminder message describing the event and the article is sent via the network to a second computer system, for presentation at the second computer system.

20 Claims, 5 Drawing Sheets

REMINDER MESSAGES

BACKGROUND

People commonly create and maintain a written "shopping lists" or "to do lists" (hereinafter "procurement lists") to keep track of items to purchase. Such lists are often handwritten and hastily composed, e.g., a grocery shopping written list on the back of a used envelope or other scrap of paper.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Handwritten procurement lists frequently have a disadvantage of being vague and/or easily misinterpreted due to one person's difficulty in reading another persons' writing or understanding the other person's intent. For example, a person may write "chicken", "pasta", and "tomato sauce" on a procurement list. Another person, or after a few days may be even the person who wrote the note, may find it difficult to discern from the list details regarding the items to be procured—e.g., what brand, what quantity, and for what meal or event the chicken, pasta, and tomato sauce are to be purchased.

In other situations, a computer user may create and store an electronic procurement list on a mobile phone or other computer, rather than utilizing a handwritten list. Some computer users will create an electronic procurement list that is standalone document in a text or word processing application format. Other computer users may include a procurement list in a cell of an electronic calendar, or record individual procurement needs utilizing a "to do" application that may or may not be associated with an electronic calendar. These methods are improvements over a handwritten paper list in that the electronic list is less likely be physically misplaced or lost, e.g., left in a shopping cart or in an automobile, than a paper list. However, these conventional electronic procurement lists still have the disadvantage of being easily misplaced or lost in other manners. The electronic procurement list is essentially misplaced or lost when a computer user has created and stored multiple lists of items to be procured, and the user cannot quickly identify and retrieve a particular desired list. Similarly, an electronic procurement list is essentially misplaced or lost in a situation where a user, rather than maintaining a multitude of lists, decides to track many multiple categories of items and items associated with multiple events in a single procurement list. In this situation, a procurement list can become unwieldy to the point that a user finds it difficult and time consuming to find and retrieve descriptions of specific items to be procured.

Accordingly, various embodiments described herein were developed to enable a computer user to easily create, maintain, and retrieve, highly specific and easily understood procurement lists that are associated with defined events. In an example of the disclosure, event data that is descriptive of an event to occur at an event time is received at a first computer system via a network. Also received at the first computer system, via the network, is reminder data that is descriptive of a reminder time to occur on or before the event time. At a time after the receipt of the event data at the first computing system, the first computing system receives via the network article data that is descriptive of an article to be procured, and the article is associated with the event. The article data is data that was created during an electronic scanning operation conducted at a computer. At the reminder time, the first computing system sends via the network to a second computer system, for presentation at the second computer system a reminder message describing both the event and the article. An advantage of the disclosure is that it makes practical a reminder service that does not require users to manually enter articles names or descriptions to create a procurement list. Another advantage of the disclosure is that it removes the need for a user to remember or identify a particular procurement list, as the list is stored in computer memory in association with a particular event and event time. In examples, the events and event times can be user-defined events and event times, e.g., "Mom's birthday" or "Our Anniversary." Another advantage of the disclosure is that the reminder message allows for easy linking of items to be procured with web pages, web sites and other internet addresses, making possible the providing of relevant advertisements, coupons, and other related information to the users of reminder service.

As used in this application, a "network" refers to a collection of computing devices interconnected by communications channels that facilitate communications and allows sharing of resources and information among the interconnected devices. In examples, the network may be a proprietary network, a secured network, an open network, an intranet, an extranet, an internet or the Internet. An "event" refers to an occasion, occurrence, incident, or other happening. For example, a bank holiday, a parent's birthday, a trip to the grocery store, and/or a scheduled time to take a medicine might each be described as an event. A "scanning operation" refers to a computer capturing in digital form and interpreting an image (an image including, but not limited to, a barcode, encoded identifier, or any other article or visual representation of an article). Examples of computers that might perform a scanning operation include, but are not limited to, optical scanners, computers with an attached handheld optical scanner unit, or smartphones, tablet computers, notebook computers, or other computing devices with an onboard camera. "Message" refers to any communication and is not meant to be limited to text or a character string. "Presentation" of content at a computing device refers to displaying, showing, rendering or otherwise making content available for visual, auditory, tactile or other reception by a user. A "printer" or "printing device" refers to any liquid inkjet printer, solid toner-based printer, liquid toner-based printer, or any other electronic device that prints. "Printer" or "printing device" includes any multi-functional electronic device that performs a function such as scanning and/or copying in addition to printing. A "network-connected printer" refers to a printer that is connected to a network, to be capable of obtaining content, sending and receiving messages, accessing network content, and/or accessing applications via a network. An "electronic calendar" refers to a calendaring program or software that provides a user with an electronic version of a calendar. An "address" for a web site or web page refers to an identifier for the web page or web site relative to other web pages or web sites on a network (e.g., the internet), and may include, but is not limited to, a URL or other network address. "Encoded" refers to presentation in a format that is generally not readable by a human without the aid of a machine. A "link" refers to a character string, address, button, or other interactive element included within an electronic document, web page, or other application page with a first network address that, when interacted with by a user, e.g., via a user interface device, causes the loading of an electronic document, web page, or application page with a second network address.

Figure 1:
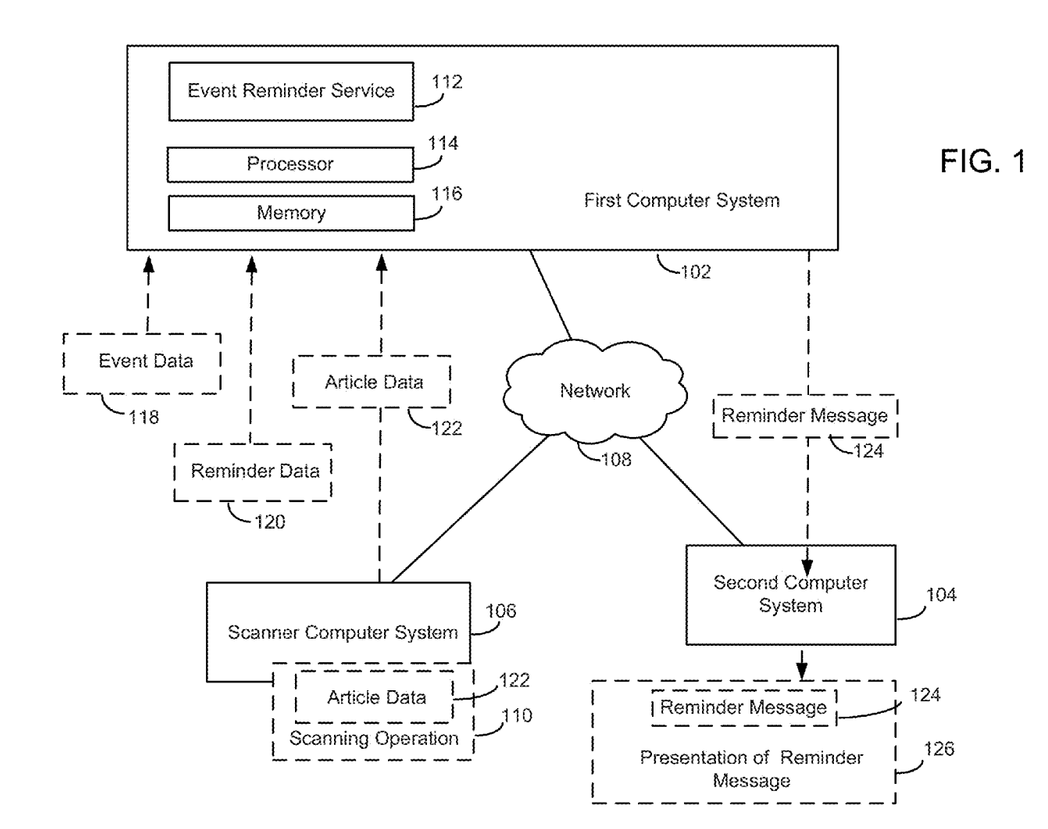
FIG. 1 is a block diagram illustrating a system according to various embodiments.

FIG. 1 shows a first computer system 102 electronically connected to a second computer system 104 and scanner computer system 106 via a network 108. First computer system 102 represents generally any computing device or group of computing devices configured to send and receive network requests, send and receive data, and/or otherwise communicate with, scanner computer system 104 and second computer system 106. In examples, first computer system 102 may be or include a server, desktop computer, notebook computer, mobile device, tablet computer, and/or any other computing device.

Second computer system 104 represents generally any computing device or group of computing devices configured to send and receive network requests, send and receive data, and/or otherwise communicate with, first computer system 102. In examples, second computer system 104 may be or include a server, desktop computer, notebook computer, mobile device, tablet computer, and/or any other computing device. In one example, second computer system 104 is a printer operable to produce a printed print job or printed content, and additionally operable to receive network requests, instructions, reminder messages, and other data from, and to send network requests, instructions, reminder messages, and other data to, and to otherwise communicate with computer system 102 over network 108.

Scanner computer system 106 represents generally any computing device or group of computing devices configured to perform a scanning operation 110, send and receive network requests, send scan data and other data to, and otherwise communicate with, computer system 102. In an example, the scanner computer system 106 may be, or include, a flatbed scanner or other optical scanner device. In another example, the scanner computer system may include a handheld optical scanner unit configured to scan and interpret one dimensional or two dimensional barcodes or other encoded identifiers. In another example, the scanner computer system 106 may be a smartphone, tablet computer, notebook computer, or other mobile computing device with an onboard camera, the camera used for scanning encoded images or other images.

Network 108 represents generally hardware components and computers interconnected by communications channels that allow sharing of resources and information. Network 108 may include a cable, wireless, fiber optic, or remote connection via a telecommunication link, an infrared link, a radio frequency link, or some combination of these, or any other connectors or systems that provide electronic communication. Network 108 may include, at least in part, an intranet, the internet, or a combination of both. Network 108 may also include intermediate proxies, routers, switches, load balancers, and the like. The paths followed by network 108 between the first computer system 102, the second computer system 104, and the scanner computer system 106 as depicted in FIG. 1 represent the logical communication paths between these devices, not necessarily the physical paths between the devices.

First computer system 102 is shown to include an event reminder service 112, a processor 114, and a memory 116. Event reminder service 112 represents generally any combination of hardware and programming configured to enable a computer user to cause the creation of event-specific procurement reminder messages, and to cause the sending of such messages to a computer system for display to the user at an established reminder time. Processor 114 represents generally any instruction execution system, such as a computer/processor based system or an ASIC (Application Specific Integrated Circuit), a computer, or other system that can fetch or obtain instructions or logic stored in memory 116 and execute the instructions or logic contained therein. Memory 116 represents generally any memory configured to store program instructions and other data.

In the example of FIG. 1, the event reminder service 112 executing at the first computer system 102 receives, via a network 108, event data 118 that is descriptive of an event to occur at an event time. In examples, the event reminder service 112 may receive the event data 118 from any computer system or computing device or computing service, including but not limited to the scanner computer system, 106, the second computer system, 104, or from another service (e.g., a calendar service) executing at first computer system 102. In examples, the event may be any occasion, occurrence, incident, or other happening. In example, the event may a user-defined event, such as "Mom's Birthday" or "Susan's Soccer Game." In another the example, the event may be an event that is predefined by a calendar service or other application, e.g., a national holiday applicable to a user. In yet another example, the event may be an event that is predefined by a calendar service that includes events specific to a profession, hobby, or other interest of a user, e.g., a calendar that is specific to a particular soccer team and includes game days and times for that team. In an example, the event time for the event may be expressed as, or otherwise include, a specific day of the week and/or time. For example "Susan's Soccer Game—5:00 p.m. Saturday Jun. 8, 2012." In another example, the event time for the event may be expressed as, or otherwise include, the lapse of a defined time period. For example, "Family Reunion to Occur in Two Weeks."

Continuing with the example of FIG. 1, the event reminder service 112 receives, via the network 108, reminder data 120 descriptive of a reminder time to occur on or before the event time. In an example, the reminder data 120 may be data descriptive of a reminder time defined or set by a user to be "two weeks prior" to the event. In another example, the reminder data 120 may be data descriptive of a reminder time that is the same as the event time. For instance, if a "Grocery Store Visit" event is defined with an event time of "12:00 p.m. Monday", the reminder time may be set to the precise time of the event ("12:00 p.m. Monday"). In yet another example, the reminder data 120 may be data descriptive of an exact reminder date and time that is prior to the event time. For instance, if a "Grocery Store Visit" event is defined with an event time of "12:00 p.m. Monday", the reminder time may be set to the precise time of "12:00 p.m. Sunday").

At some time after the event reminder service 112 receives the event data 118, the service 112 receives via the network 108 article data 122 that is descriptive of an article to be associated with the event. The article data 122 is data that is created by a computer during an electronic scanning operation 110. In the example of FIG. 1, the scanning operation is conducted by scanner computer system 106, and after completion of the scanning operation 110 the scanner computer system 106 sends the article data 122 to the event reminder service 112 at the first computer system 112. In examples, the scanner computer system 106 may be or include a flatbed scanner, an optical scanner device, a handheld barcode reader or other handheld optical scanner unit, or a smartphone, notebook computer, tablet computer, or other mobile computing devices with an onboard camera for scanning encoded images and other images and articles.

In an example previously presented in this application in which the user-defined event is "Mom's Birthday", the article data 122 may be data created during a scanning operation in which a hand held scanner unit is utilized to scan a barcode in a printed catalog, the barcode associated with a sweater to be purchased in connection with the birthday. In another example previously presented in this application in which the user-defined event is "Susan's Soccer Game", the article data 122 may be data created during a scanning operation in which a smartphone with a camera is utilized to scan barcodes included within tags on equipment to be brought to the game. For instance a user might create the article data by scanning barcodes on items in the user's garage or sports equipment room, the data indicative of equipment and other items to be brought to the soccer game. Similarly, in another example previously presented in this application in which the user-defined event is a "Family Reunion to Occur in Two Weeks", the article data 122 may be data created during a scanning operation in which a smartphone with a camera is utilized to scan barcodes on packaging of food items to be brought, or purchased and brought, to the family reunion. For instance, such scanning may be a scanning operation in which items are scanned that already in inventory, e.g., in the family refrigerator. In another instance, such scanning may be a scanning operation in which food items are scanned during a first grocery store visit, such that the article data can be used to in a reminder for a second grocery store visit closer to the date of the family reunion.

At the reminder time, the event reminder service 112 sends to the second computer system 104, via the network 108, a reminder message 124 describing the event and the associated article. The event reminder service 112 sends the reminder message 124 to the second computer system 104 in order that the second computer system 104 present 126 the reminder message 124 to a user. In one example, the second computer system 104 includes a monitor, touchscreen, or other visual display device and the presentation includes a visual display of the reminder at the display device. In another example, the second computer system 104 is a printer, and presentation of the reminder message 124 at the second computer system includes a printing of the reminder message 124 at the printer. In another example, the second computer system 104 includes a speaker or other auditory display device, and the presentation of the reminder message 124 at the second computer system 104 is an auditory display (e.g., a spoken word or musical auditory display). In another example, the second computer system 104 may present the reminder message using a combination of two or more of a visual display at a monitor or screen, a printing of the reminder message 124, and/or an auditory display of the reminder message 124.

The functions and operations described with respect to event reminder service 112 and first computer system 102 may be implemented as a non-transitory computer-readable storage medium containing instructions executed by a processor (e.g., processor 114) and stored in a memory (e.g., memory 116). In a given implementation, processor 114 may represent multiple processors, and memory 116 may represent multiple memories. Processor 114 represents generally any instruction execution system, such as a computer/processor based system or an ASIC, a computer, or other system that can fetch or obtain instructions or logic stored in memory 116 and execute the instructions or logic contained therein. Memory 116 represents generally any memory configured to store program instructions and other data.

Figure 2:
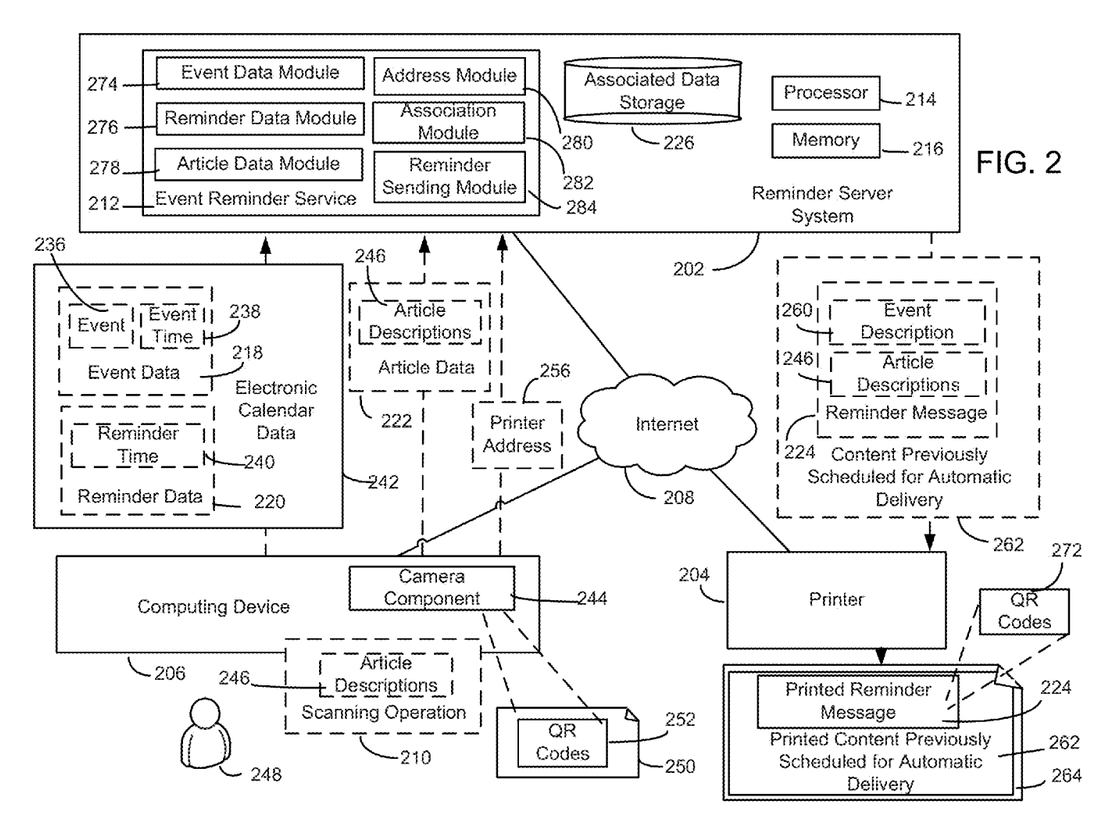
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a reminder server system 202 electronically connected to a printer 204 and a computing device 206 via an internet 208. Reminder server system 202 represents generally any computing device or group of computing devices configured to send and receive network requests, send and receive content, and otherwise communicate with 204 and computing device 206. In examples, reminder server system 202 may be or include a server, desktop computer, notebook computer, mobile device, tablet computer, and/or any other computing device.

Printer 204 represents generally a printer computing device that is operable to produce a printed print job or printed content. In this example, printer 204 is a network connected printer additionally operable to send network requests, print jobs and other content to, receive network requests, print jobs, and other content from, and otherwise communicate with reminder server system 202 over internet 208. In another example, not shown in FIG. 2, the printer 204 may be a printer that is indirectly connected to the internet, e.g., the printer is connected to a desktop computer, notebook computer, or other host computing device that is connected to the internet 208. In the latter example, the host computing device may be any computing device or system configured to send and receive network requests, send and receive content (including sending print jobs), and otherwise communicate with printer 204.

Computing device 206 represents generally a computing device, or group of computing devices, configured to send and receive network requests, send content to, and otherwise communicate with, reminder server system 202. In examples, computing device 206 may be a smartphone, tablet computer, notebook computer, desktop computer, or any other computing device.

Internet 208 represents generally hardware components and computers interconnected by communications channels that allow sharing of resources and information over an internet or intranet network, or over a combination of both.

Internet 208 may include a cable, wireless, fiber optic, or remote connection via a telecommunication link, an infrared link, a radio frequency link, or some combination of these, or any other connectors or systems that provide electronic communication. Internet 208 may also include intermediate proxies, routers, switches, load balancers, and the like. The paths followed by internet 208 between reminder server system 202, printer 204, and computing device 206 as depicted in FIG. 2 represent the logical communication paths between these devices, not necessarily the physical paths between the devices.

Reminder server system 202 is shown to include an event reminder service 212, an associated data storage database 226, a processor 214, and a memory 216. Event reminder service 212 represents generally any combination of hardware and programming configured to enable creation of event-specific procurement reminder messages, and cause sending of such messages to a computer system for display to the user at an established reminder time. The service 212 includes an event data module 274, a reminder data module 276, an article data module 278, an address module 280, an association module 282, and a reminder sending module 284. Associated data storage database 226 represents generally a database, registry, lookup table or list that associates event data, reminder data, and article data in memory in association with one another. Processor 214 represents generally any instruction execution system, such as a computer/processor based system or an ASIC, a computer, or other system that can fetch or obtain instructions or logic stored in memory 216 and execute the instructions or logic contained therein. Memory 216 represents generally any memory configured to store program instructions and other data.

In the example of FIG. 2, the event data module 274 included within event reminder service 212 and executing at reminder server system 202 receives, via the internet 208, event data 218 descriptive of an event to occur at an event time. In this example, the event data 218 includes a description of a "Julie's Birthday" event 236 and a "2:00 p.m. June 27 PDT" event time 238. In this example, the event data 218 is sent by the computing device 206 to the reminder server system 202, over the internet 208, and is sent in electronic calendar format. Examples of electronic calendars include, but are not limited to, Microsoft Outlook®, Lotus Notes®, and the calendar features of many PDAs and smartphones. In an example, receiving event data in electronic calendar format may include receiving an entire electronic calendar file that includes the event data. In another example, receiving event data in electronic calendar format may include receiving the event data, but less than data for an entire electronic calendar, in an electronic calendar format. Examples of electronic calendar file formats include, but are not limited to, the proprietary ".pst" or ".nsf" formats. In other examples, the event data and/or an entire electronic calendar may be received by the reminder server system 202 in a non-proprietary calendar format.

The reminder data module 276 receives, via the Internet 208, reminder data 220 descriptive of a reminder time 240 to occur on or before the event time 238. In the example of FIG. 2, the reminder data 220 may be data descriptive of a reminder time 240 defined or set by a user to be "one week away" or "one week prior" to the "Julie's Birthday" event 236. In the example of FIG. 2, the computing device 206 sends, and the reminder server system 202 receives, the reminder data 220 in the electronic calendar format as the event data 218 was sent in. In an example, the event data 218 and the reminder data 220 are received contemporaneously by the reminder server system as electronic calendar data 242.

At some time following the event data module's 274 receipt of the event data 218, the computing device 206 sends, and the article data module 278 receives, article data 222 via the internet 208. In this example, the article data 222 is data including descriptions 246 of a cake, birthday decorations, a piñata, and a present (a bicycle) articles 250 to be associated with the "Julie's Birthday" event 236. The article data 222 is created by the computing device 206 during an electronic scanning operation 210. In the example of FIG. 2, the scanning operation included a user 248 at the computing device 206 taking a digital photograph of QR codes or other encoded identifiers 252 for the articles 250 utilizing a camera component 244 included within the computing device 206. For instance, the QR code identifiers 252 may QR codes included within a sales brochure for an entity that sells children's birthday cakes, party favors, and gifts via mail order. In another instance, the QR code identifiers 252 may be QR codes displayed as part of a web page that facilitates an online retail store for children's birthday items.

Figure 3:
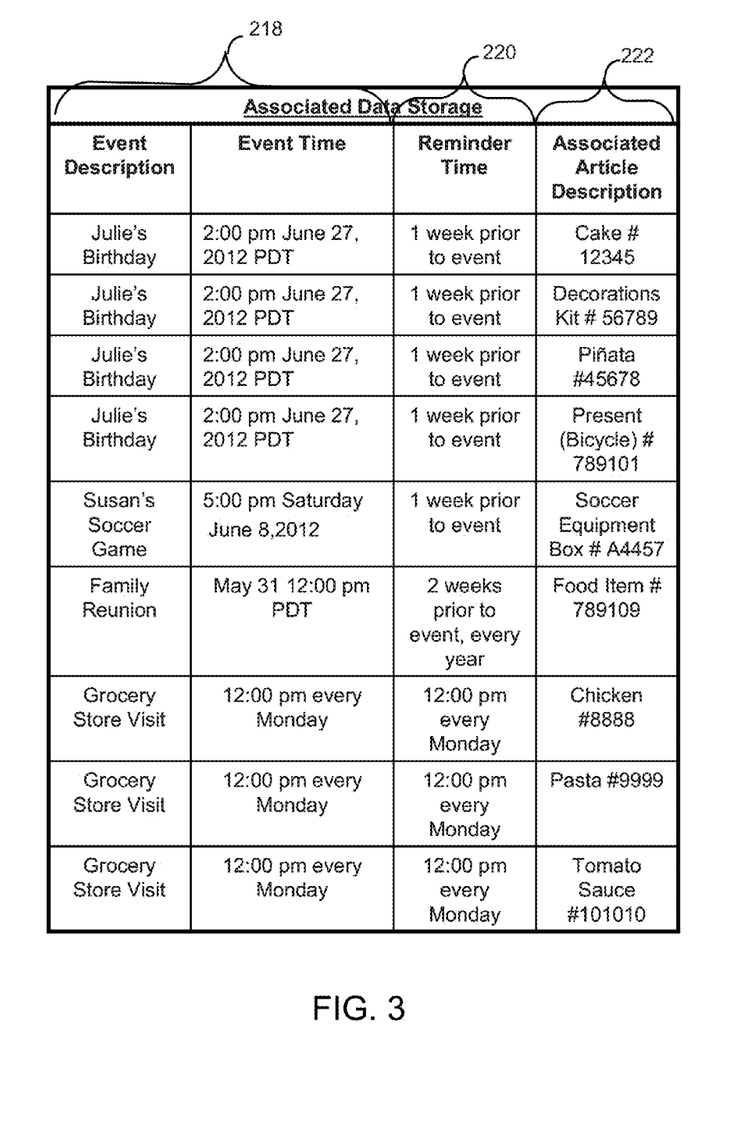
FIG. 3 depicts an example of associated storage of event data, reminder data, and article data, according to various embodiments.

In the example of FIG. 2, an association module 282 of the event reminder service 212 causes the storage of the article data 222, and the previously received event data 218 and reminder data 220, in memory in association with one another. FIG. 3, in view of FIG. 2, provides an example of associated storage of event data 218, reminder data 220, and article data 222 at a database identified as "Associated Data Storage" 226 located within reminder system 202. In other examples, article data 222, event data 218, and reminder data 220, may be stored in association with one another in a database or other memory included within a computer system separate from, but electronically connectible with, reminder system 202.

In the example of FIG. 2, the computing device 206 sends, and the article data module 278 receives, a printer address 256 for the printer 204. In an example the printer address 256 is an email address for a network connected printer 204, and the printer address is 256 is supplied to the mobile computing device via user 248 input at the mobile computing device's touchscreen user interface. In another example, the printer address 256 may be an IP address for a network connected printer 204, and may be an address that was stored at computing device 206 in connection with an already accomplished printing or scanning task involving printer 204.

Continuing with FIG. 2, at the reminder time 240 designated in the reminder data 220, the reminder sending module 284 sends to the printer 204, at the printer address 256 previously received by the address module 280 and via the internet 208, a reminder message 224. The reminder message 224 includes a description 260 describing the event 236 and descriptions 246 of the articles associated with the event 236. In this example, the reminder message 224 is sent by the reminder server system 202, via the internet 208, to the printer 204 along with scheduled delivery content 262. The reminder message is sent to the printer 204 for presentation at the printer 204, in this case printing, along with the scheduled delivery content 262. In examples, the scheduled delivery content 262 may be a scheduled delivery of a magazine article, newspaper article, children's coloring page, daily crossword puzzle, recipe, or any other type of content that can be sent for presentation to a user. In examples, the automatic scheduled delivery content 262 may be scheduled for delivery at specific times and dates. In other examples, the automatic scheduled delivery content 262 may be scheduled for delivery at a defined time at regular intervals such as "6:00 p.m. PDT daily", "6:00 p.m. PDT Wednesday weekly", or "6:00 p.m. PDT daily on the last day of each month." In other examples, the automatic scheduled delivery content 262 may be scheduled for delivery at regular date intervals, such as "daily", "weekly", and "monthly", with the delivery times at irregular times according to a formula. In the example of FIG. 2, the automatic scheduled delivery content 262 is sent to a printer 204 for printing presentation to a user. In other examples of the disclosure, the automatic scheduled delivery content 262 may be content sent to a mobile phone, notebook computer, tablet computer, gaming computer, or any other computing device.

In the example of FIG. 2, the reminder sending module 284 sends the reminder message 224 to the printer 204 in a manner such that, when printed, the reminder message 224 is embedded within the content 224 that was previously scheduled for automatic delivery. The printed output 264 includes the content previously scheduled for automatic delivery 224, and also, as an item embedded with the previously scheduled delivery content 224, the printed reminder message 224.

Figure 4:
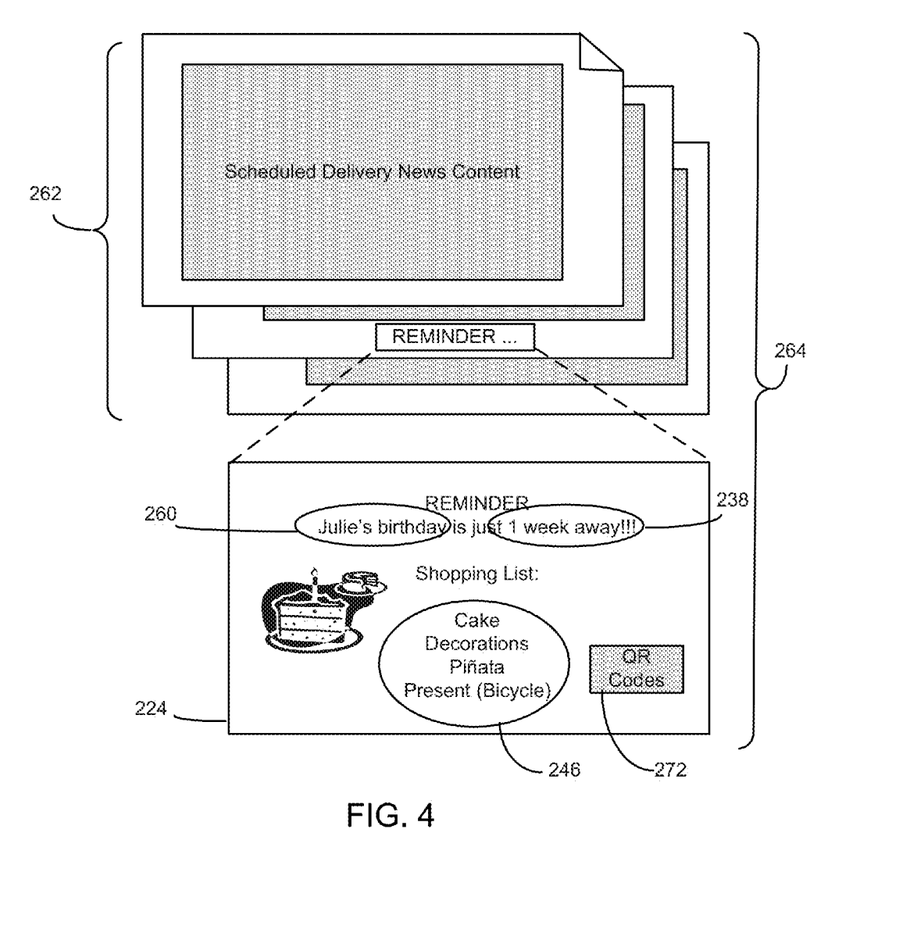
FIG. 4 depicts an example reminder message describing an event and an article, for presentation at a computer system, according to various embodiments.

FIG. 4 provides additional detail of the printed output 264 of FIG. 2. In this example of FIG. 4, in view of FIG. 2, the printed output 264 produced by the printer 204 includes the printed content previously scheduled for automatic delivery 262 and the reminder message 224. In this example the reminder message includes the event description 260 "Julie's Birthday" 260, the event time 238 "one week away", and the articles descriptions 246 "cake, decorations, piñata, and present (bicycle)." In this example, the printed reminder message 224 also includes a QR code 272 that, when electronically scanned by a scanning device and interpreted by a computer, is a link to additional information relating to one or more of the articles. For instance, by scanning the QR code on the printed reminder with a mobile telephone with camera functionality, a user might access relevant advertisements, coupons, and other desired information relative to the articles and article descriptions 246.

The functions and operations described with respect to event reminder service 212 and reminder server system 202 may be implemented as a non-transitory computer-readable storage medium containing instructions executed by a processor (e.g., processor 214) and stored in a memory (e.g., memory 216). In a given implementation, processor 214 may represent multiple processors, and memory 216 may represent multiple memories. Processor 214 represents generally any instruction execution system, such as a computer/processor based system or an ASIC, a computer, or other system that can fetch or obtain instructions or logic stored in memory 216 and execute the instructions or logic contained therein. Memory 216 represents generally any memory configured to store program instructions and other data.

Figure 5:
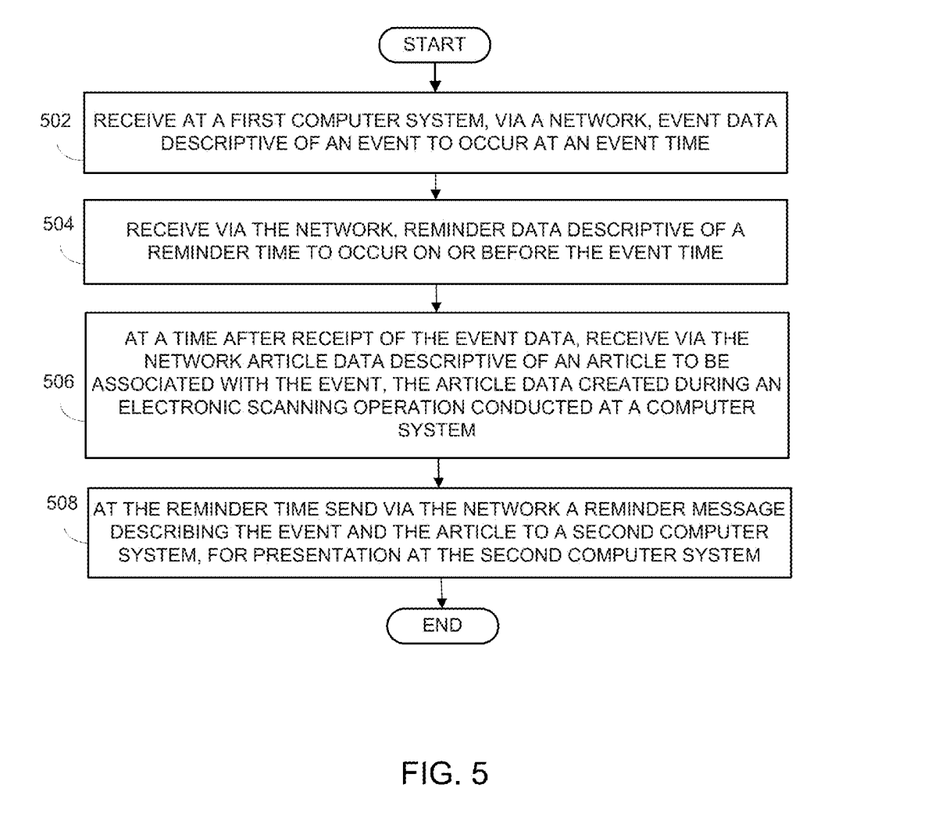
FIG. 5 is a flow diagram depicting steps taken to implement various embodiments.

FIG. 5 is a flow diagram of operation in a system according to various embodiments. In discussing FIG. 5, reference may be made to the diagram of FIG. 2 to provide contextual examples. Implementation, however, is not limited to those examples. Starting with FIG. 5, event data descriptive of an event to occur at an event time is received, via a network, at a first computer system (block 502). Referring back to FIG. 2, event data module 274 may be responsible for implementing block 502.

Continuing with FIG. 5, reminder data descriptive of a reminder time to occur on or before the event time is received via the network (block 504). Referring back to FIG. 2, reminder data module 276 may be responsible for implementing block 504.

Continuing with FIG. 5, at a time after receipt of the event data, receive via the network article data descriptive of an article to be associated with the event, the article data created during an electronic scanning operation (block 506). Referring back to FIG. 2, article data module 278 may be responsible for implementing block 506.

Continuing with FIG. 5, at the reminder time send via the network a reminder message describing the event and the article to a second computer system, for presentation at the second computer system (block 508). Referring back to FIG. 2, reminder sending module 284 may be responsible for implementing block 508.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium containing instructions, the instructions when executed by a processor causing the processor to:
   receive at a first computer system, via a network, event data descriptive of an event to occur at an event time;
   receive via the network, reminder data descriptive of a reminder time to occur on or before the event time;
   at a time after receipt of the event data, receive via the network article data descriptive of an article to be associated with the event, the article data created during an electronic scanning operation; and
   at the reminder time send via the network a reminder message describing the event and the article to a second computer system, for presentation at the second computer system.

2. The medium of claim 1, wherein the reminder message is sent to the second computer system for presentation with a scheduled delivery of user-requested content sent to the second computer system.

3. The medium of claim 2, wherein the reminder message is sent to the second computer system such that, when presented, the reminder message is embedded within the content.

4. The medium of claim 1, wherein the second computer system is a printer, and the presentation of the reminder message includes printing the reminder message at the printer.

5. The medium of claim 1, wherein the event data is received in a format of an electronic calendar.

6. The medium of claim 1, wherein the event is a user defined event.

7. The medium of claim 1, wherein the instructions cause the processor to receive an address for the second computer system, and to send the reminder message to the second computer system at the address.

8. The medium of claim 1, wherein the electronic scanning operation includes scanning of an encoded identifier associated with the article.

9. The medium of claim 1, wherein the reminder message includes an encoded identifier that, when electronically scanned by a scanning device and interpreted by a computer, is a link to information relating to the article.

10. The medium of claim 1, wherein the electronic scanning operation is conducted at a computing device that includes a camera, and the scanning operation includes taking of a digital photograph of the article or an identifier of the article utilizing the camera.

11. The medium of claim 1, wherein the instructions cause the processor to store the event data, the reminder data, and the article data in memory in association with one another.

12. The medium of claim 1, wherein the event time includes a specific day of the week or time.

13. The medium of claim 1, wherein the event time includes a lapse of a defined time period.

14. A first computer system, comprising:
at least one processor;
an event data module executable by the at least one processor to receive, via a network, event data descriptive of an event to occur at an event time;
a reminder data module executable by the at least one processor to receive, via the network, reminder data descriptive of a reminder time to occur on or before the event time;
an article data module executable by the at least one processor to, at a time following receipt of the event data, receive via the network article data descriptive of an article to be associated with the event, the article data created during an electronic scanning operation; and
a reminder sending module executable by the at least one processor to, at the reminder time, send a reminder message describing the event and the article to a second computer system, for presentation at the second computer system.

15. The system of claim 14, wherein the reminder message is sent to the second computer system along with a scheduled delivery of user-requested content sent to the second computer system for printing.

16. The system of claim 15, wherein the reminder message is sent to the second computer system such that, when printed, the reminder message is embedded within the content.

17. The system of claim 14, wherein the event data is received in a format of an electronic calendar and the event is a user defined event.

18. The system of claim 14, wherein the electronic scanning operation includes scanning of a barcode or other encoded identifier associated with the article.

19. The system of claim 14, wherein the second computer system is a network connected printer, and the presentation of the reminder message includes printing the reminder message at the printer.

20. A method, comprising:
receiving, at a first computer system via a network and in a format of an electronic calendar, event data descriptive of an event to occur at an event time;
receiving, at the first computer system via the network, reminder data descriptive of a reminder time to occur on or before the event time;
receiving, at the first computer system, an address for a network connected printer;
at a time after receipt of the event data, receiving, at the first computer system via the network, article data descriptive of an article to be associated with the event, the article data created during an electronic scanning of an identifier of the article conducted at a scanner computer system; and
at the reminder time, sending, by the first computer system, a reminder message describing the event and the article to the printer at the address, for printing the reminder message at the printer, wherein the reminder message is sent to the printer along with a scheduled delivery of user-requested content to the printer.

* * * * *